United States Patent
Skriver et al.

(10) Patent No.: US 9,253,088 B2
(45) Date of Patent: Feb. 2, 2016

(54) BREAKING LOOPS IN OVERLAY NETWORKS USING AN IP TRANSPORT HEADER

(71) Applicant: Cisco Technology, Inc., San Jose, CA (US)

(72) Inventors: Jesper Skriver, Latsia (CY); Isidoros Kouvelas, Halandri (GR); Christian Cassar, Hampton (GB)

(73) Assignee: Cisco Technology, Inc., San Jose, CA (US)

( * ) Notice: Subject to any disclaimer, the term of this patent is extended or adjusted under 35 U.S.C. 154(b) by 147 days.

(21) Appl. No.: 13/930,614

(22) Filed: Jun. 28, 2013

(65) Prior Publication Data
US 2015/0003452 A1   Jan. 1, 2015

(51) Int. Cl.
*H04L 12/28* (2006.01)
*H04L 12/741* (2013.01)
*H04L 12/733* (2013.01)

(52) U.S. Cl.
CPC ............. *H04L 45/74* (2013.01); *H04L 45/20* (2013.01)

(58) Field of Classification Search
None
See application file for complete search history.

(56) References Cited

U.S. PATENT DOCUMENTS

| 7,054,277 | B1 | 5/2006 | Lau et al. |
| 7,076,594 | B2 | 7/2006 | Benedetto et al. |
| 7,412,557 | B2 | 8/2008 | Di Benedetto et al. |
| 7,477,593 | B2 | 1/2009 | Scudder et al. |
| 7,864,712 | B2 | 1/2011 | Khan et al. |
| 7,869,345 | B2 | 1/2011 | Scudder et al. |
| 8,018,953 | B1 | 9/2011 | Zhao |
| 2006/0130126 | A1* | 6/2006 | Touve et al. ............. 726/5 |
| 2010/0189118 | A1 | 7/2010 | Nonaka |
| 2011/0064002 | A1 | 3/2011 | Khan et al. |
| 2011/0134793 | A1 | 6/2011 | Elsen et al. |
| 2012/0113871 | A1 | 5/2012 | Bulusu |
| 2013/0088974 | A1 | 4/2013 | Bryant et al. |
| 2014/0328343 | A1* | 11/2014 | Kapadia et al. ............ 370/392 |

OTHER PUBLICATIONS

Farinacci, et al., "The Locator/ID Separation Protocol (LISP)", Request for Comments 6830, Jan. 2013, 75 pages, Internet Engineering Task Force Trust.
Shand, M. and Bryant, S., Cisco Systems: "A Framework for Loop-free Convergence; draft-ietf-rtgwg-lf-conv-frmwk-02.txt", vol. RTGWG, No. 2, Feb. 14, 2008.
International Search Report issued Nov. 3, 2014 in connection with PCT/US2014/044729.

* cited by examiner

*Primary Examiner* — Afshawn Towfighi
(74) *Attorney, Agent, or Firm* — Parker Ibrahim & Berg LLC; James M. Behmke; Stephen D. LeBarron

(57) ABSTRACT

In one embodiment, a device receives a payload encapsulated in an Internet Protocol (IP) transport header having a time-to-live (TTL) value, and decapsulates the payload while maintaining the TTL value. In response to determining that a destination of the payload is not attached to the device, the device may then re-encapsulate the payload in a new IP transport header with a new TTL value that is less than the maintained TTL value, and transmits the re-encapsulated payload toward the destination. In this manner, loops in overlay networks may be prevented based on eventual expiration of the TTL value of the IP transport header, accordingly.

20 Claims, 10 Drawing Sheets

| DESTINATION ADDRESS 310 | ATTACHED DEVICE 320 |
|---|---|
| A | NVE1 |
| B | NVE1 |
| C | NVE3 |
| ... | ... |
| N | NVE2 |

MAPPING TABLE 300

FIG. 3

BREAKING LOOPS IN OVERLAY NETWORKS USING AN IP TRANSPORT HEADER

TECHNICAL FIELD

The present disclosure relates generally to computer networks, and, more particularly, to breaking loops in overlays networks using an IP transport header.

BACKGROUND

For various reasons as will be understood in the art, network configurations may use Layer 2 (L2) and/or Layer 3 (L3) overlays on top of an Internet Protocol (IP) network. In addition, there is often a requirement for a maximum loss duration on the order of tens of milliseconds when a host moves locations within a network. This requirement cannot be easily met by a distributed system that requires multiple nodes to be updated upon a move. The only realistic way to achieve the required convergence, is the ability to do a temporary local repair at the old location away from which the host moved. At this time, the repair is applied to packets/frames that incorrectly arrive at the old host location, which redirects/re-encapsulates them toward the new host location.

For an L3 overlay carrying IP payload such a redirect is risk free, as even if nodes (transiently) have the wrong information, and a redirection loop is formed the packet will not loop forever. In particular, the time-to-live (TTL) field of the payload IP packet will decrement on every node performing a re-encapsulation and will eventually decrement to zero resulting in the packet being discarded (even if such discarding is a relatively slow process).

For an L2 overlay carrying L2 payload on the other hand, there is no hop-count or TTL in the typical L2 frame header, such as Ethernet, so if a loop is formed the packet will loop forever until the loop is broken by control plane activity. Traditional Ethernet networks use the Spanning Tree Protocol (STP) to prevent such loops from occurring, but overlay networks like virtual extensible local area network (VXLAN) do not run STP. Instead, they prevent loops by split-horizon techniques, where a node will not re-encapsulate a frame that was received over the overlay to another node on the overlay. However, the use of split-horizon prevents the redirection/re-encapsulation required in order to achieve the fast convergence via a local repair.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 3 illustrates an example mapping table.

DESCRIPTION OF EXAMPLE EMBODIMENTS

Overview

According to one or more embodiments of the disclosure, a device receives a payload encapsulated in an Internet Protocol (IP) transport header having a time-to-live (TTL) value, and decapsulates the payload while maintaining the TTL value. In response to determining that a destination of the payload is not attached to the device, the device may then re-encapsulate the payload in a new IP transport header with a new TTL value that is less than the maintained TTL value, and transmits the re-encapsulated payload toward the destination. In this manner, loops in overlay networks may be prevented based on eventual expiration of the TTL value of the IP transport header, accordingly.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain."

Figure 1:
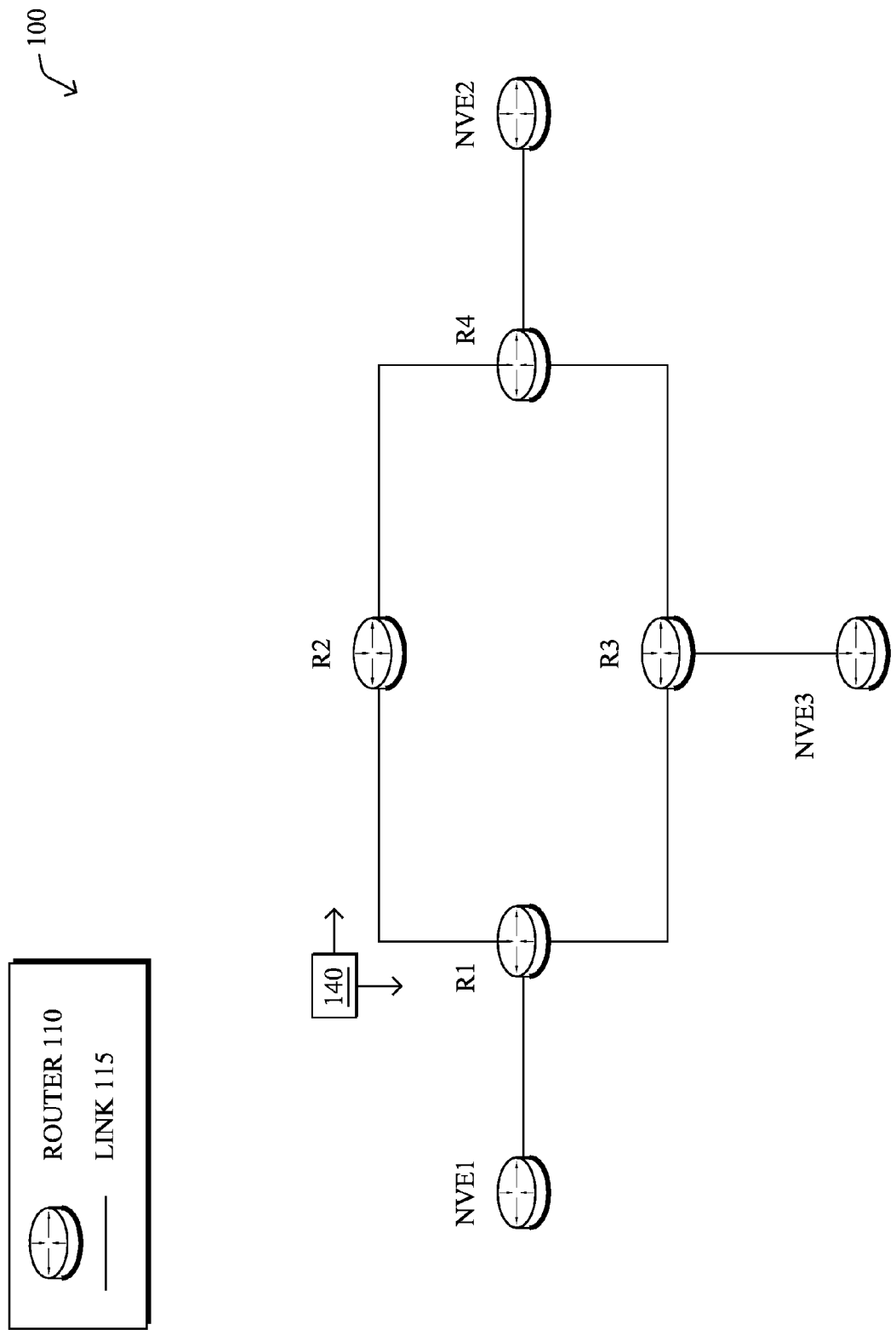
FIG. 1 illustrates an example computer network.

FIG. 1 is a schematic block diagram of an example computer network 100 illustratively comprising nodes/devices, such as a plurality of routers 110 (e.g., NVE1, NVE2, NVE3, and R1-R4) interconnected by links 115, as shown. As used herein, links may be labeled by their corresponding endpoints, such as the link between nodes R1 and R2 being referred to herein as "link R1-R2" (or equally "link R2-R1"). Those skilled in the art will understand that any number of nodes, devices, links, etc. may be used in the computer network, and that the view shown herein is for simplicity. Those skilled in the art will also understand that while the embodiments described herein is described generally, it may apply to any network configuration within an Autonomous System (AS) or area, or throughout multiple ASes or areas, etc.

Data packets 140 (e.g., traffic/messages) may be exchanged among the nodes/devices 110 of the computer network 100 over links 115 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc.

Figure 2:
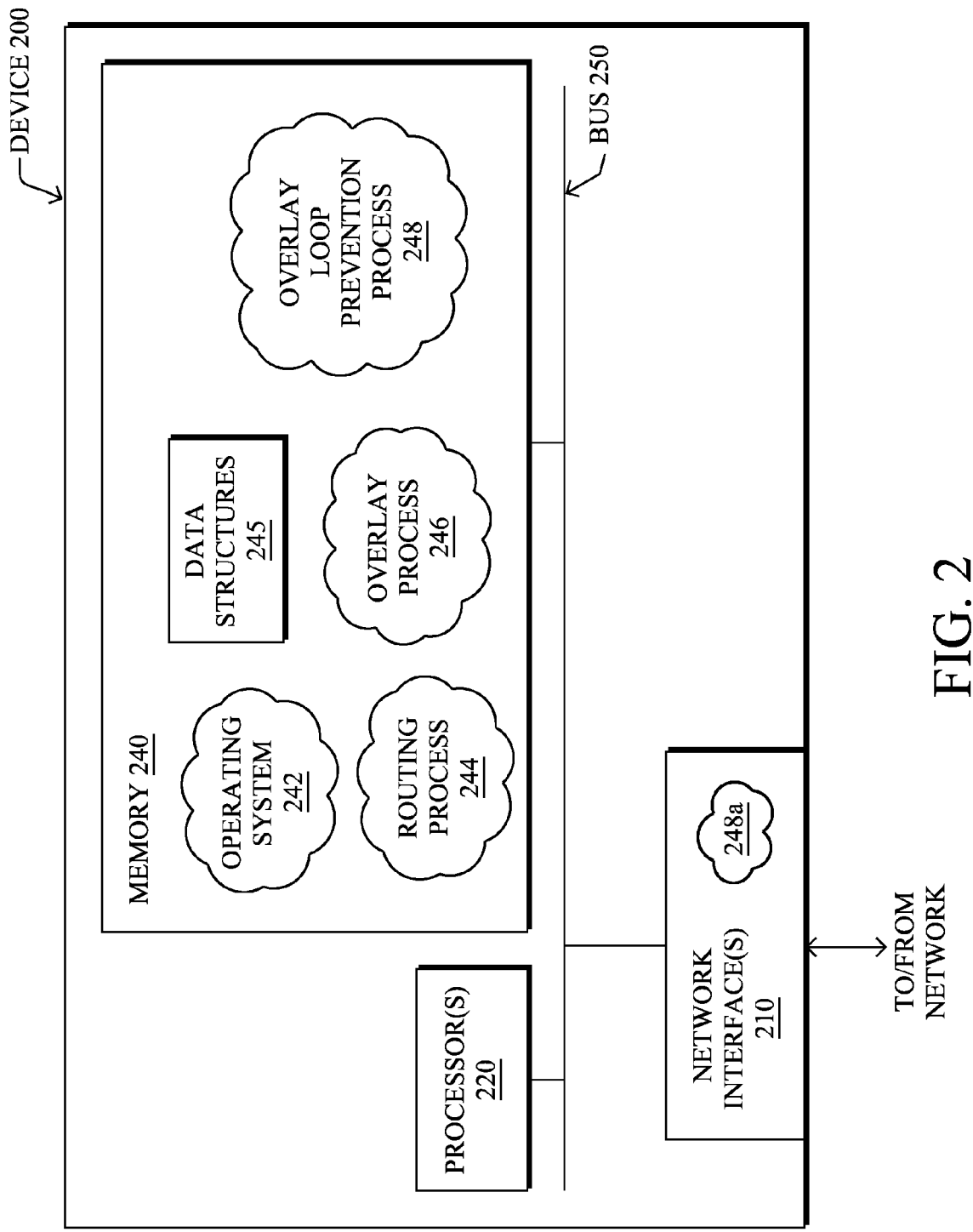
FIG. 2 illustrates an example network device/node.

FIG. 2 is a schematic block diagram of an example node/device 200 that may be used with one or more embodiments described herein, e.g., as a router 110. The device comprises a plurality of network interfaces 210, one or more processors 220, and a memory 240 interconnected by a system bus 250. The network interfaces 210 contain the mechanical, electrical, and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for Virtual Private Network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc.), portions of which are typically resident in memory 240 and executed by the processor(s), functionally organizes the node by, inter alia, invoking network operations in support of software processes and/or services executing on the device. These software processes and/or services may comprise routing services 244 and an overlay process 246 that may, for example, facilitate the operation of network overlay protocols as described herein. Additionally, these software processes and/or services may further comprise an illustrative "overlay loop prevention" process 248, as described herein, which may alternatively be located within individual network interfaces (e.g., process 248a).

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process/services 244 contain computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database (not shown) containing, e.g., data used to make forwarding decisions. In particular, changes in the network topology may be communicated among routers 200 using routing protocols, such as the conventional OSPF and IS-IS link-state protocols (e.g., to "converge" to an identical view of the network topology). Notably, routing services 244 may also perform functions related to virtual routing protocols, such as maintaining VRF instances (not shown), or tunneling protocols, such as for Multi-Protocol Label Switching (MPLS), generalized MPLS (GMPLS), etc., each as will be understood by those skilled in the art.

Overlay process 246 contains computer executable instructions executed by processor 220 to perform functions provided by one or more overlay-based protocols, as will be understood by those skilled in the art. In particular, as noted above, Network Virtualization is an emerging technology in the market. An overlay network, in particular, is a computer network which is built on the top of another network, where nodes in the overlay can be thought of as being connected by virtual or logical links, each of which corresponds to a path, perhaps through many physical links, in the underlying network. For example, distributed systems such as cloud computing, peer-to-peer networks, and client-server applications are overlay networks because their nodes run on top of the Internet. Illustratively, FIG. 1 may represent a simplified overlay topology (e.g., an L2 or L3 overlay on top of an IP network), where network virtualization edge (NVE) devices (NVE1-3) provide ingress and egress to the virtualized network consisting of routers R1-R4, and where NVE devices are tasked with encapsulating and decapsulating payloads between the virtualization overlay and physical underlay to reach attached devices (or sites) at each respective edge device.

As noted above, there is often a requirement for a maximum loss duration on the order of tens of milliseconds when a host moves locations within a network. This requirement cannot be easily met by a distributed system that requires multiple nodes to be updated upon a move. The only realistic way to achieve the required convergence, is the ability to do a temporary local repair at the old location away from which the host moved. At this time, the repair is applied to packets/frames that incorrectly arrive at the old host location, which redirects/re-encapsulates them toward the new host location.

As also noted above, for an L3 overlay carrying IP payload such a redirect is risk free, as even if nodes (transiently) have the wrong information, and a redirection loop is formed the packet will not loop forever. In particular, the time-to-live (TTL) field of the payload IP packet will decrement on every node performing a re-encapsulation and will eventually decrement to zero resulting in the packet being discarded (even if such discarding is a relatively slow process).

For an L2 overlay carrying L2 payload on the other hand, there is no hop-count or TTL in the typical L2 frame header, such as Ethernet, so if a loop is formed the packet will loop forever until the loop is broken by control plane activity. Traditional Ethernet networks use the Spanning Tree Protocol (STP) to prevent such loops from occurring, but overlay networks like virtual extensible local area network (VXLAN) do not run STP. Instead, they prevent loops by split-horizon techniques, where a node will not re-encapsulate a frame that was received over the overlay to another node on the overlay. However, the use of split-horizon prevents the redirection/re-encapsulation required in order to achieve the fast convergence via a local repair.

For example, NVE1 has an out of date mapping table pointing to NVE2 for a given destination, but that destination is now attached to NVE3. When NVE2 receives an encapsulated frame from NVE1, it cannot re-encapsulate the frame over the overlay to NVE3 because of the split-horizon rule, even if it knows the destination is attached to NVE3. This results in loss of connectivity until the mapping table on NVE1 is updated.

Breaking Loops in Overlay Networks

As described in greater detail below, the techniques herein carry the TTL of an encapsulation IP transport header across a decapsulation and re-encapsulation operation, without relying on propagating the TTL of the header to a TTL field in the payload, thus being particularly useful for overlays carrying payloads (e.g., L2 payloads) that do not have a TTL field. In particular, the techniques herein preserve the IP TTL of the transport header of the overlay as received before decapsulation, and reuses it if a node has to re-encapsulate the frame back onto the overlay. The re-encapsulated packet thus carries an IP transport TTL that is less than that of the received packet (e.g., by one). This ensures that any potential loops are broken by the transport IP packet having its TTL decremented to zero resulting in the frame being discarded.

Specifically, according to one or more embodiments of the disclosure as described in detail below, a device receives a payload encapsulated in an IP transport header having a TTL value, and decapsulates the payload while maintaining the TTL value. In response to determining that a destination of the payload is not attached to the device, the device may then re-encapsulate the payload in a new IP transport header with a new TTL value that is less than the maintained TTL value, and transmits the re-encapsulated payload toward the destination. In this manner, loops in overlay networks may be prevented based on eventual expiration of the TTL value of the IP transport header, accordingly.

Illustratively, the techniques described herein may be performed by hardware, software, and/or firmware, such as in accordance with the "overlay loop prevention" process 248/248a, which may contain computer executable instructions executed by the processor 220 (or independent processor of interfaces 210) to perform functions relating to the techniques described herein, e.g., in conjunction with routing process 244 and/or overlay process 246. For example, the techniques herein may be treated as extensions to conventional overlay encapsulation/redirection protocols, and as such, may be processed by similar components understood in the art that execute those protocols, accordingly.

Operationally, the current location of a given destination is present in a mapping tables of all the nodes in the network that encapsulate traffic to the destination (e.g., NVEs). A simplified example of a maintained a mapping table for decapsulated destinations is shown in FIG. 3, where the table 300 may be stored in a local memory of the device (e.g., as a data structure 245). This mapping between destination addresses 310 and attached devices 320 may be obtained via a push or a pull protocol, and the concepts herein apply equally regardless how the mappings are distributed in the network, as it provides a temporary local repair at the node where the host moved away from, until such a time as all nodes encapsulating to the host have updated their mappings via some unrelated mechanism.

Figure 4A:
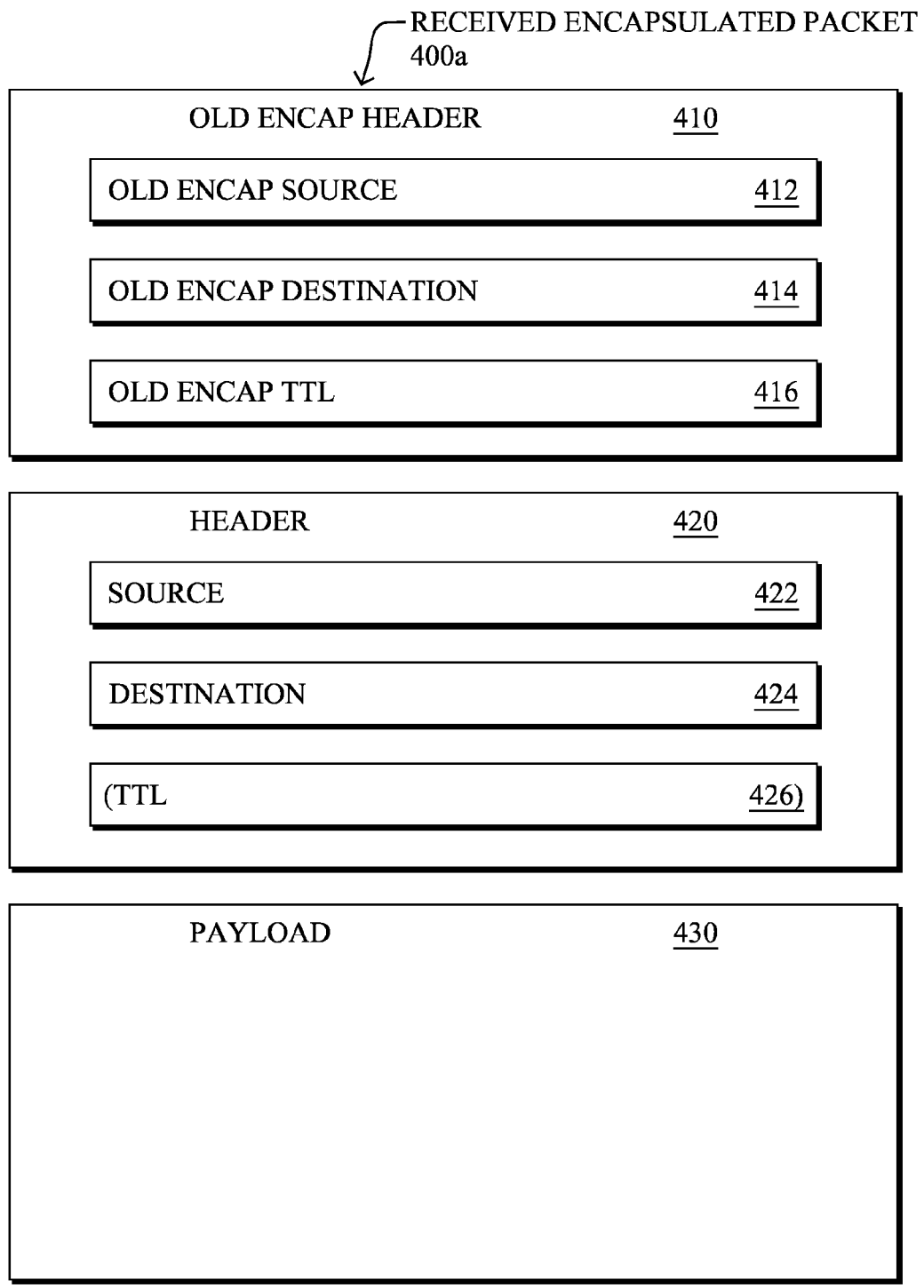
FIGS. 4A-C illustrate an example of packet encapsulations.

Rather than using split-horizon, the techniques herein use the TTL in the transport IP header used by the overlay network, to make redirections/re-encapsulations safe without risking any loops, even for L2 payloads. Illustratively, FIG. 4A shows an example simplified encapsulated packet format (packet 400a), where a received encapsulation header 410 (i.e., an IP transport header), comprising some encapsulation source ("old encap source") 412 and destination ("old encap destination") 414, carries a TTL value ("old encap TTL") 416. This encapsulation header 410 essentially encapsulates a payload, consisting of an original (decapsulated) header 420 and payload 430, with an associated source 422 and destination 424. (In some embodiments, as described below, the encapsulated packet/payload may have its own TTL field 426, as well.)

Figure 4B:
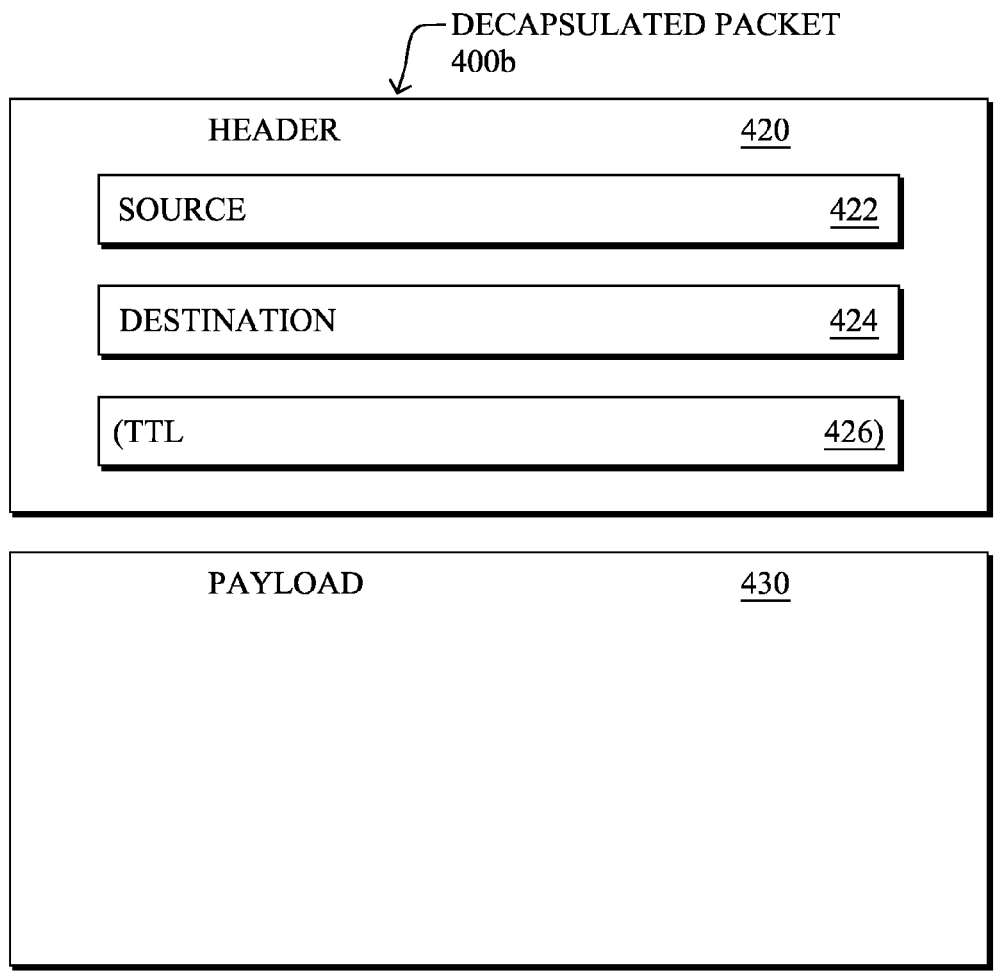
Figure 4C:
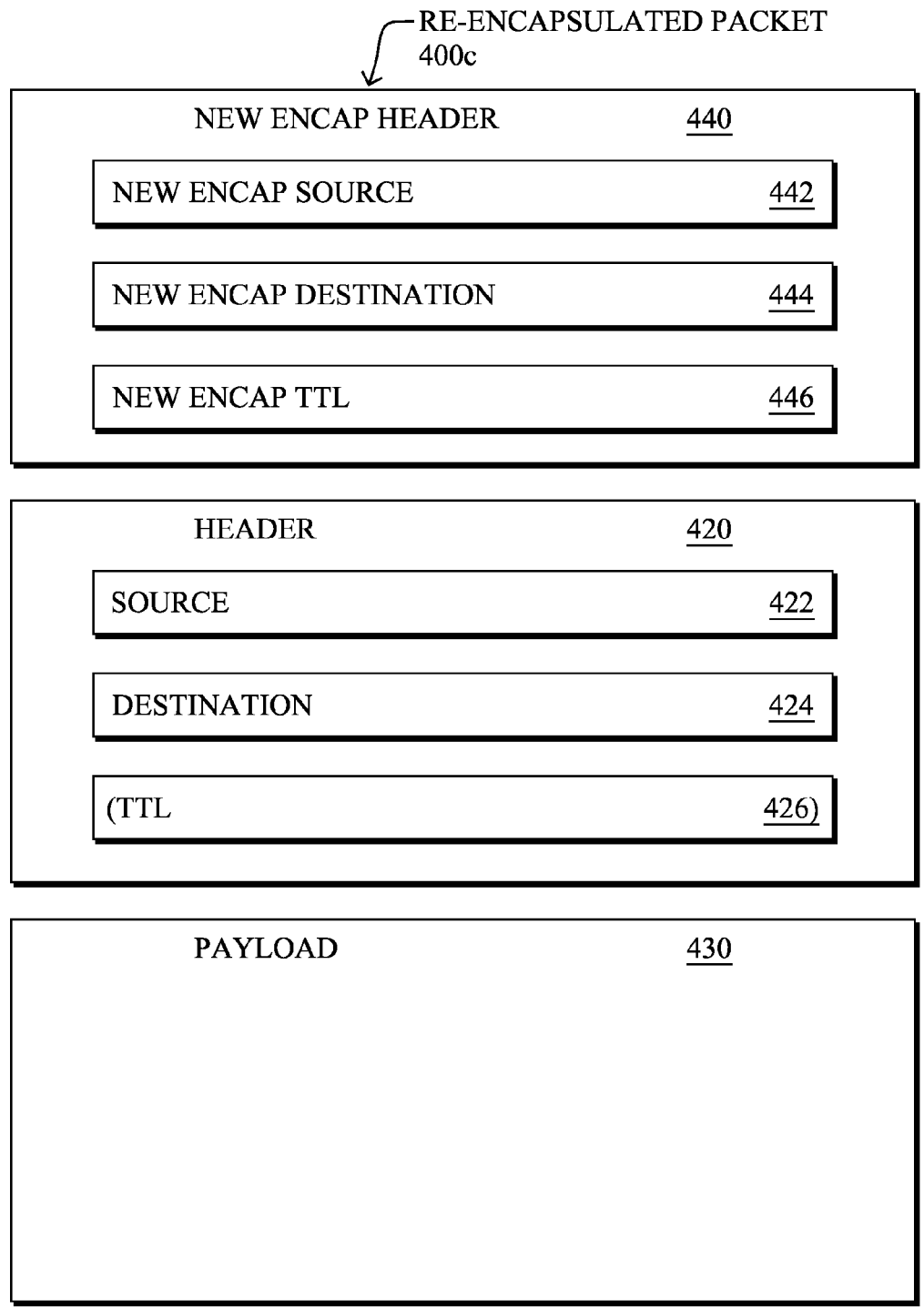

According to the techniques herein, upon receiving a payload encapsulated in an IP transport header having a TTL value 416, with reference now to FIG. 4B, the decapsulating device (e.g., NVE) decapsulates the payload into decapsulated packet 400b, and maintains (temporarily stores) the value of the old encapsulation TTL 416. If the device receives a packet/frame from the overlay for a destination that is not attached to it, the device will redirect/re-encapsulate the packet/frame to the new location (based on the mapping table 300) over the overlay as a re-encapsulated packet 400c as shown in FIG. 4C. The re-encapsulated packet 400c will carry a new encapsulation header 440, along with a new encapsulation source 442 and destination 444, with a new TTL 446 in the encapsulation IP transport header that is less than (e.g., decremented to one less than) the maintained TTL in the received encapsulation IP transport header (the old encapsulation TTL 416). The device then transmits the re-encapsulated payload toward the destination, that is, to a decapsulating device attached to the destination of the payload according to the mapping table. In this manner, if the mappings are somehow wrong (i.e., an incorrect mapping table of a source encapsulating device), and a loop is formed, the packet will have its TTL decremented to zero somewhere in the network, and it will be discarded since the intermediate network nodes (e.g., R1-R4) also decrement the TTL values within IP transport headers during transport.

In more general words, the techniques herein carry the TTL in the encapsulation IP transport header across a "decap" and "encap" operation, without relying on propagating it to a TTL field in the payload. As such, the techniques herein are particularly useful for overlays carrying L2 payload that do not have a TTL field. In addition, for this reason the same mechanisms can also be used for overlays carrying L3 payloads (with its own TTL field 426), where TTL propagation is not required for traceroute. In this case, the techniques herein may use a lower TTL in the transport IP header (when encapsulating, thus either 416 or 446, depending upon perspective) than the TTL 426 of the L3 payload, thus breaking potential loops earlier.

Figure 5A:
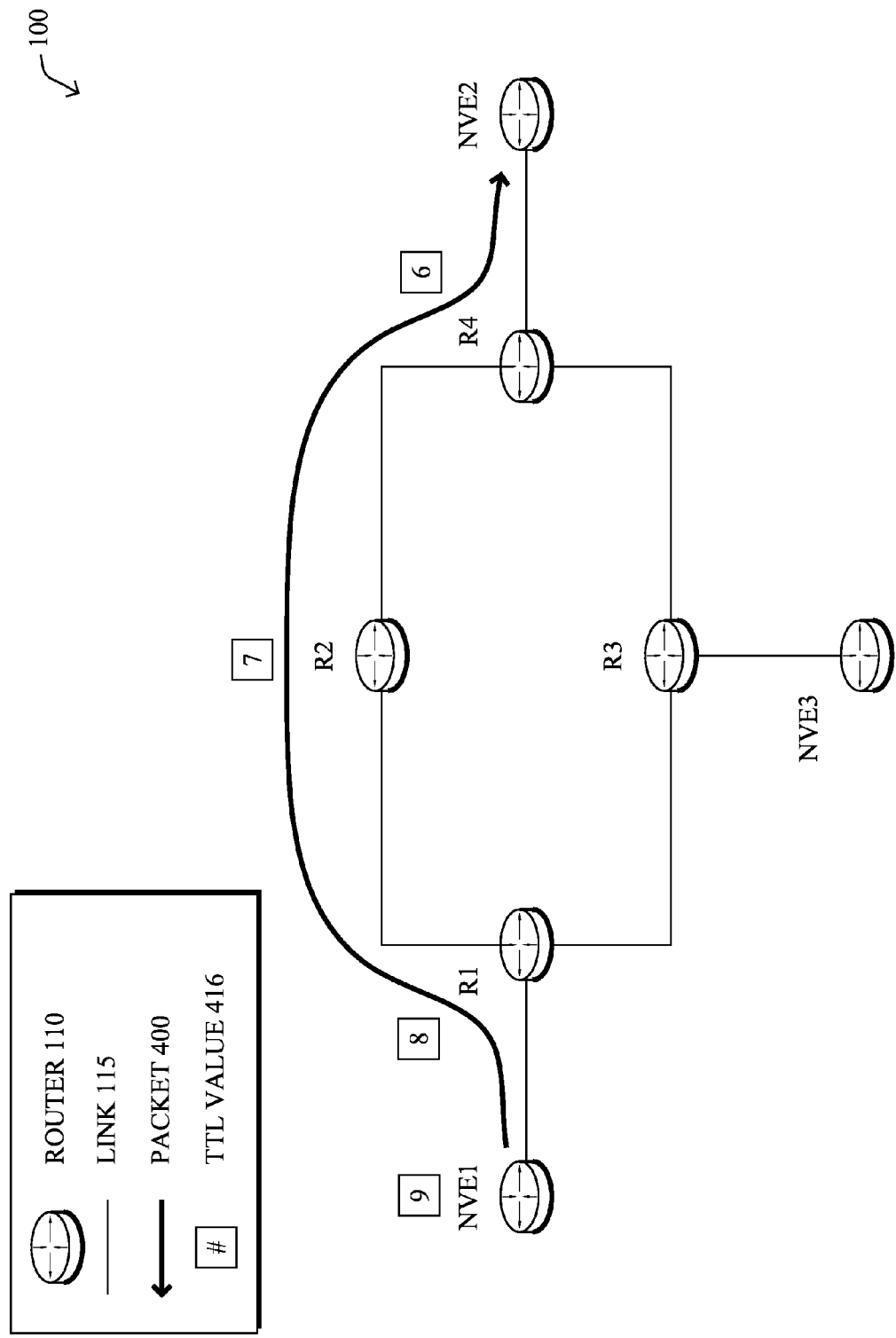
FIGS. 5A-5C illustrate examples of message passing in the computer network in accordance with the techniques herein.
Figure 5B:
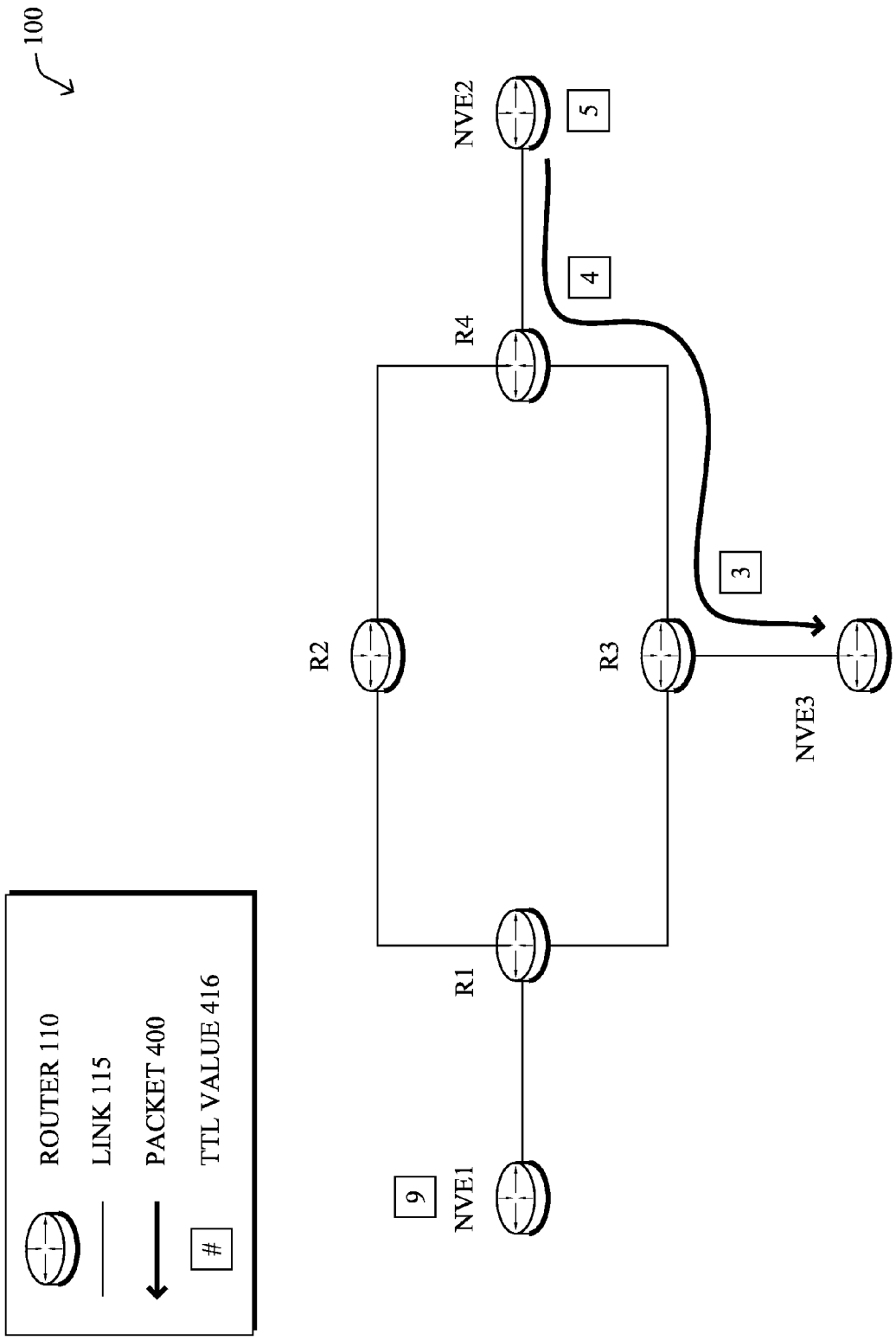
Figure 5C:
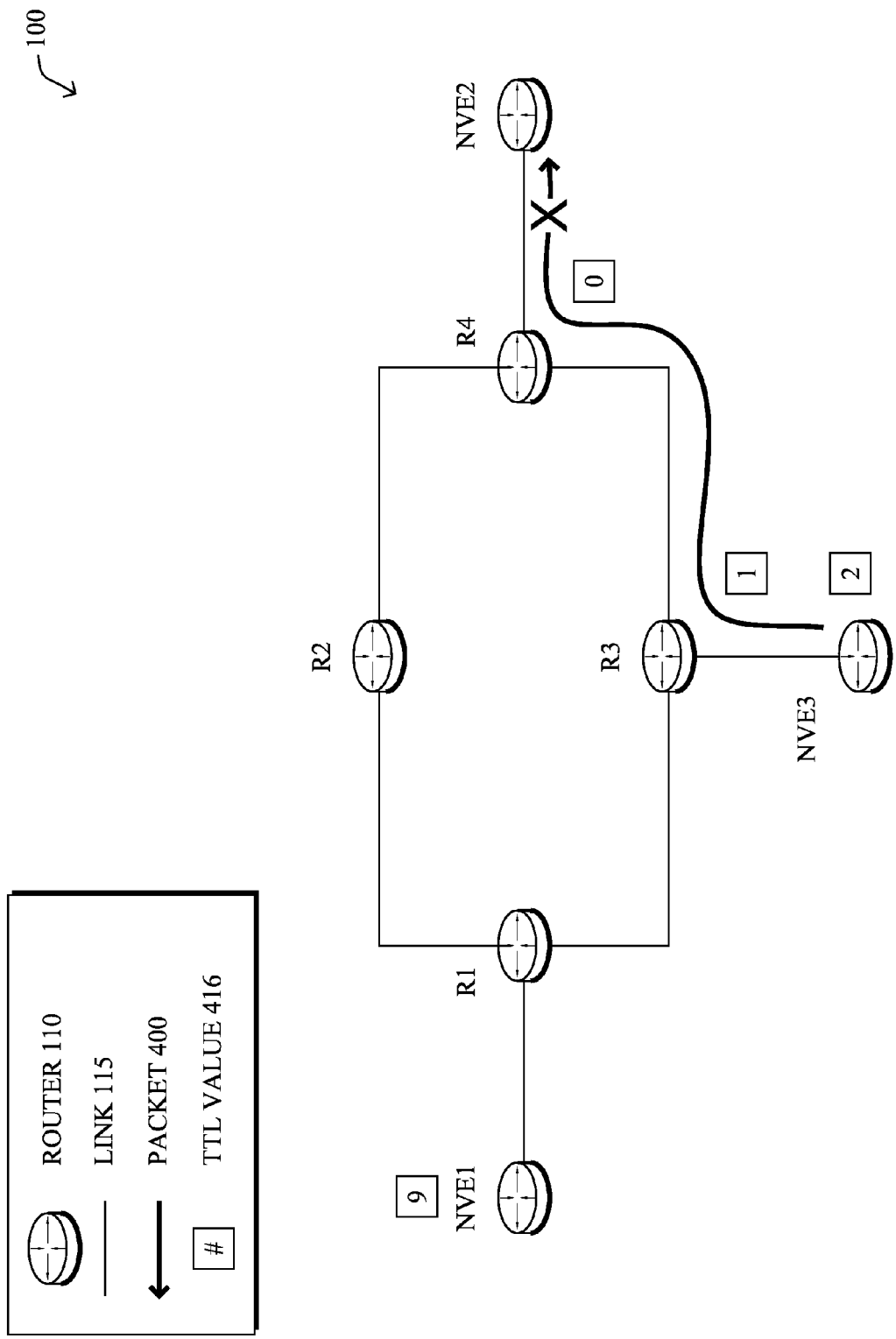

FIGS. 5A-5C illustrate an example passing of packet 400 (400a-c, generally) within the network 100 according to the techniques herein. For instance, as shown in FIG. 5A, assume that NVE1 receives an ethernet frame where its mapping table for the destination MAC points to NVE2. NVE1 will encapsulate the ethernet frame with some protocol specific header (e.g., VXLAN) and transmits the IP packet with a TTL of N (e.g., 9, for illustrative purposes). When NVE2 receives this packet, the TTL of the transport header will have been decremented by every IP router in the path from NVE1 to NVE2, so the TTL will be some value M smaller than N (e.g., 6).

When NVE2 looks up the decapsulated destination MAC address 424 in its forwarding tables, it finds that the destination is no longer attached to it, but is reachable over the overlay and the mapping table points to NVE3. If split-horizon was used, NVE2 would have no choice but to drop the frame at this point, but by using the techniques herein, it can re-encapsulate the frame to NVE3, using a transport IP TTL value 446 of (M−1) as shown in FIG. 5B (e.g., 5). Similarly when NVE3 receives the packet, the TTL of the transport header will again have been decremented by every IP router in the path from NVE2 to NVE3, and the TTL will be 0, where 0 is smaller than M−1 (e.g., 3).

In the typical case, NVE3 would find that the destination MAC is attached to it, and it will deliver the payload Ethernet frame (header 420 and payload 430) to the destination host, having successfully avoided the loss that would otherwise have occurred until NVE1's mapping table was updated pointing to NVE3 instead of NVE2. If instead for some reason NVE2 and NVE3 disagree about the location of the destination MAC, the techniques herein alleviate the risk of any such loops. In particular, as shown in FIG. 5C, even if NVE3's mapping table for the destination MAC points to NVE2 (whose mapping table pointed to NVE3), the packet/frame will not loop as the transport IP header TTL which is preserved across a re-encapsulation will at some point decrement to zero, and the packet will be discarded (e.g., at R4 as shown).

Figure 6:
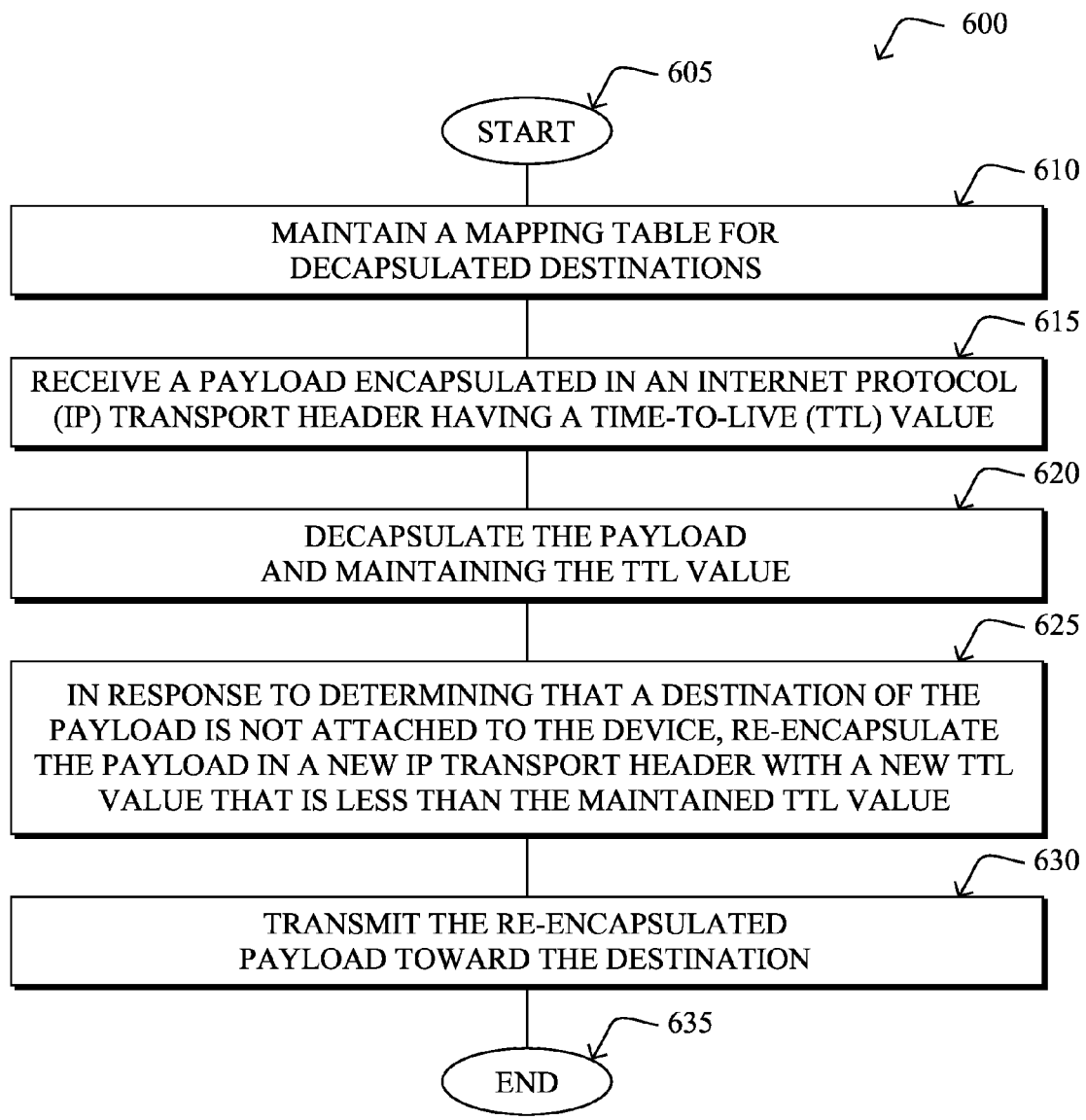
FIG. 6 illustrates an example simplified procedure for breaking loops in overlay networks using an IP transport header.

FIG. 6 illustrates an example simplified procedure 600 for breaking loops in overlay networks using an IP transport header in accordance with one or more embodiments described herein. The procedure 600 may start at step 605, and continues to step 610, where, as described in greater detail above, an edge device (e.g., NVE) maintains a mapping table 300 for decapsulated destinations that may be used when receiving a payload 430 encapsulated in an IP transport header 410 having a TTL value 416 in step 615. In particular, upon receipt, in step 620 the device decapsulates the payload and maintains the TTL value 416, such that in response to determining that a destination of the payload is not attached to the device in step 620, the device may re-encapsulate the payload in a new IP transport header with a new TTL value 446 that is less than the maintained TTL value. Accordingly, in step 630, the device transmits the re-encapsulated payload toward the destination (according to the mapping table), such that intermediate devices or other edge devices receiving the packet decrement the TTL in a manner that prevents loops in overlay networks based on eventual expiration of the TTL value of the IP transport header. The procedure illustratively ends in step 635.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for breaking loops in overlay networks using an IP transport header. In particular, the techniques herein optimize the transport of L2 overlays in the presence of endpoint mobility, applying to campus environments as well as data centers with host mobility (e.g., VXLAN implementations). Moreover, the techniques herein minimize loss through the local repair of forwarding by redirecting the packet back over the overlay network to the new location, without the risk of loops, and is functional for L2 payloads (e.g., Ethernet), unlike techniques that work for L3 payloads only, or that merely avoid decapsulating the payload in the first place (i.e., staying within an L3 tunnel at the edge devices upon redirection).

While there have been shown and described illustrative embodiments that provide for breaking loops in overlay networks using an IP transport header, it is to be understood that various other adaptations and modifications may be made within the spirit and scope of the embodiments herein. For example, the embodiments have been shown and described herein with relation to particular types of overlay networks. However, the embodiments in their broader sense are not as limited, and may, in fact, be used with other types of overlay networks and/or environments. In addition, while certain protocols are shown or certain terminologies, other suitable protocols and corresponding terminologies may be used, accordingly. For example, when implemented according to the Internet Engineering Task Force (IETF) Request for Comment (RFC) 6830, entitled "The Locator/ID Separation Protocol (LISP)", the concept thus relies on the TTL of the outer Routing Locator (RLOC) IP header. That is, if an egress tunnel router (ETR) (e.g., an edge device, NVE, etc.) preserves and decrements the TTL of the RLOC header across a redirection decap/encap cycle, even if the Endpoint Identifier (EID) payload is not IP, then when a loop occurs, it will be broken by the TTL eventually decrementing to zero according to the techniques herein.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   receiving, at a device, a payload encapsulated in an Internet Protocol (IP) transport header having a time-to-live (TTL) value;
   decapsulating the payload and maintaining the TTL value;
   in response to determining that a destination of the payload is not attached to the device, re-encapsulating the payload in a new IP transport header with a new TTL value that is less than the maintained TTL value; and
   transmitting the re-encapsulated payload toward the destination,
   wherein the TTL value in the IP transport header is carried across the decapsulating and re-encapsulating, without having to propagate the TTL value to a field in an original header of the payload.

2. The method as in claim 1, wherein the new TTL value is less than the maintained TTL value by one.

3. The method as in claim 1, wherein the payload is a layer 2 (L2) payload and the original header does not include a TTL field.

4. The method as in claim 1, wherein the payload is a layer 3 (L3) payload and the original header of the payload does include a TTL field.

5. The method as in claim 1, further comprising:
   maintaining a mapping table for decapsulated destinations.

6. The method as in claim 5, wherein transmitting the re-encapsulated payload comprises transmitting the re-encapsulated payload to a decapsulating device attached to the destination of the payload according to the mapping table.

7. The method as in claim 5, wherein the destination of the payload is not attached to the device when the mapping table is an incorrect mapping table of a source encapsulating device.

8. The method as in claim 1, wherein intermediate network nodes decrement TTL values within IP transport headers during transport.

9. An apparatus, comprising:
one or more network interfaces to communicate within a computer network;
a processor coupled to the network interfaces and adapted to execute one or more processes; and
a memory configured to store a process executable by the processor, the process when executed operable to:
receive a payload encapsulated in an Internet Protocol (IP) transport header having a time-to-live (TTL) value;
decapsulate the payload and maintaining the TTL value;
in response to determining that a destination of the payload is not attached to the device, re-encapsulate the payload in a new IP transport header with a new TTL value that is less than the maintained TTL value; and
transmit the re-encapsulated payload toward the destination,
wherein the TTL value in the IP transport header is carried across the decapsulating and re-encapsulating, without having to propagate the TTL value to a field in in an original header of the payload.

10. The apparatus as in claim 9, wherein the new TTL value is less than the maintained TTL value by one.

11. The apparatus as in claim 9, wherein the payload is a layer 2 (L2) payload and the original header of the payload does not include a TTL field.

12. The apparatus as in claim 9, wherein the payload is a layer 3 (L3) payload and the original header of the payload does include a TTL field.

13. The apparatus as in claim 9, wherein the process when executed is further operable to:
maintain a mapping table for decapsulated destinations.

14. The apparatus as in claim 13, wherein transmitting the re-encapsulated payload comprises transmitting the re-encapsulated payload to a decapsulating device attached to the destination of the payload according to the mapping table.

15. The apparatus as in claim 13, wherein the destination of the payload is not attached to the device when the mapping table is an incorrect mapping table of a source encapsulating device.

16. The apparatus as in claim 9, wherein intermediate network nodes decrement TTL values within IP transport headers during transport.

17. A tangible, non-transitory, computer-readable media having software encoded thereon, the software when executed by a processor operable to:
receive a payload encapsulated in an Internet Protocol (IP) transport header having a time-to-live (TTL) value;
decapsulate the payload and maintaining the TTL value;
in response to determining that a destination of the payload is not attached to the device, re-encapsulate the payload in a new IP transport header with a new TTL value that is less than the maintained TTL value; and
transmit the re-encapsulated payload toward the destination,
wherein the TTL value in the IP transport header is carried across the decapsulating and re-encapsulating, without having to propagate the TTL value to a field in in an original header of the payload.

18. The computer-readable media as in claim 17, wherein the new TTL value is less than the maintained TTL value by one.

19. The computer-readable media as in claim 17, wherein the payload is one of either a layer 2 (L2) payload or a layer 3 (L3) payload.

20. The computer-readable media as in claim 17, wherein the software when executed is further operable to:
maintain a mapping table for decapsulated destinations.

* * * * *